United States Patent
Fritsche et al.

(10) Patent No.: US 8,394,187 B2
(45) Date of Patent: Mar. 12, 2013

(54) BAKEABLE, SCREEN-PRINTABLE ANTI-REFLECTION COATING FOR GLASS

(75) Inventors: Klaus-Dieter Fritsche, Colditz (DE); Gerhard Tünker, Heusenstamm (DE)

(73) Assignee: Ferro GmbH, Frankfurt am Main (DE)

( * ) Notice: Subject to any disclaimer, the term of this patent is extended or adjusted under 35 U.S.C. 154(b) by 524 days.

(21) Appl. No.: 12/600,475

(22) PCT Filed: May 10, 2008

(86) PCT No.: PCT/EP2008/003801
§ 371 (c)(1),
(2), (4) Date: Jan. 4, 2010

(87) PCT Pub. No.: WO2008/145253
PCT Pub. Date: Dec. 4, 2008

(65) Prior Publication Data
US 2011/0052815 A1    Mar. 3, 2011

(30) Foreign Application Priority Data
May 31, 2007 (DE) .......................... 10 2007 025 590

(51) Int. Cl.
| | |
|---|---|
| *C09D 5/00* | (2006.01) |
| *C09D 7/12* | (2006.01) |
| *C09D 101/08* | (2006.01) |
| *C09D 101/10* | (2006.01) |
| *C09D 101/26* | (2006.01) |
| *C09D 101/28* | (2006.01) |

(52) U.S. Cl. ............... 106/170.2; 106/177.1; 106/203.1; 106/287.1; 106/287.11; 106/287.12; 106/287.13; 106/287.14; 106/287.15; 106/287.34

(58) Field of Classification Search ............... 106/203.1, 106/217.12–217.17, 287.34, 287.1–287.15, 106/170.2, 177.1
See application file for complete search history.

(56) References Cited

U.S. PATENT DOCUMENTS

| | | |
|---|---|---|
| 6,863,923 B1 | 3/2005 | Kalleder et al. |
| 2004/0186216 A1 | 9/2004 | Satoh et al. |
| 2007/0017402 A1 | 1/2007 | Jordens et al. |

FOREIGN PATENT DOCUMENTS

| | | |
|---|---|---|
| WO | 00/10934 | 3/2000 |

OTHER PUBLICATIONS

International Search Report for corresponding PCT/EP2008/003801 mailed Aug. 22, 2008, three pages.

*Primary Examiner* — David M Brunsman
(74) *Attorney, Agent, or Firm* — Rankin, Hill & Clark LLP

(57) ABSTRACT

A composition for the production of an antireflection coating, comprising a condensate obtainable by the condensation of silicon compounds of the general formula $R_nSiX_{4-n}$ (I) in which the X groups are the same or different and represent hydrolyzable groups or hydroxyl groups, the R groups are the same or different and represent non-hydrolyzable groups, and n is 0, 1, 2, or 3, wherein the composition comprises at least one polymeric agent controlling the rheology and at least one solvent with a boiling point of at least 150° C. The present invention also describes methods for the preparation and use of the present composition. In particular, the composition can be applied by screen printing methods on substrates.

25 Claims, No Drawings

BAKEABLE, SCREEN-PRINTABLE ANTI-REFLECTION COATING FOR GLASS

This application is a 371 filing of PCT/EP08/03801, filed May 10, 2008.

The present invention relates to compositions for the production of anti-reflection coatings, processes for the production of these compositions and the use thereof.

When light passes through the interface between two media with different refractive indices, some of the radiation is reflected. For normal incidence of light on a sheet of glass with a refractive index of n=1.5, the proportion reflected totals about 8%. In the case of oblique incidence of light on to the interface, a much greater proportion is generally reflected. A high degree of reflection is undesirable for many applications, as it leads to a reduction in transmission.

Attempts have therefore been made to reduce this reflection. For example, surfaces have been provided with a highly porous coating in order to achieve this goal.

Coatings of this type are set out e.g. in DE 196 42 419 A1, DE 199 18 811 A1, DE 10 2004 027842 A1, DE 10 2006 001078 A1, WO 03/027034 A2, DE 100 51 724 A1 and DE 100 51 725 A1.

The document DE 196 42 419 A1 describes the use of specific polymers for the production of compositions with which anti-reflection coatings can be obtained particularly simply and cost-effectively. However, the compositions can only be applied using dip coating methods.

In the document DE 199 18 811 A1, compositions containing special polymers in order to produce an anti-reflection coating are likewise set out. In particular, the compositions can be used to coat safety glass. These compositions too can be applied only by dip coating methods.

The anti-reflection layers described in DE 10 2004 027842 A1 contain a high proportion of MgF$_2$. A particular disadvantage here is the price of MgF$_2$. Moreover, if the coated substrates are not disposed of properly, environmentally harmful and toxic hydrofluoric acid (HF) can form.

A multi-layer anti-reflection coating is set out in DE 10 2006 001078 A1, wherein the coating comprises a dense layer and a porous layer. The dense layer generally comprises fluorides, so this coating has the disadvantages set out above. Although it is described that the porous layer can be applied by "bar-coating methods", no specific exemplary embodiment of this can be found in this document. No polymers are used to produce the compositions.

The unexamined published patent application WO 03/027034 A2 describes anti-reflection coatings having particularly high mechanical stability. This property is achieved by the use of SiO$_2$ particles with a specific particle size distribution. The compositions used for the coating are applied by dipping methods.

Furthermore, the document DE 100 51 724 A1 discloses a coating solution for the production of anti-reflection layers. However, this solution can only be applied by dipping methods, spray methods or spin coating methods.

Moreover, the publication DE 100 51 725 A1 sets out compositions for the production of anti-reflection layers which contain a large proportion of surfactants. However, this solution can only be applied by dipping methods, spray methods or spin coating methods.

Dipping methods are actually relatively expensive, since large amounts of coating solution have to be prepared in order to immerse a pane completely. Enormous dust problems have to be overcome here in order to obtain a defect-free coating. Screen-printing methods or roller application, on the other hand, are technically simpler to perform.

Screen-printable SiO$_2$ sols are also known, but these sols are not suitable for the production of anti-reflection coatings. Sols of this type are set out for example in DE 199 46 712 A1, DE 38 26 715 A1 and by Johanna Krön, Gerhard Schottner, Karl-Joachim Deichmann; Fundamentals of Glass Science & Technology—3rd ESG Conf. 1995; Glastech. Ber. Glass Sei. Technol. 68 Cl (1995), pp. 378-385.

It is particularly problematic that simple variations of the compositions set out above for the production of anti-reflection coatings do not lead to screen-printable pastes by means of which coatings with good anti-reflection properties can be obtained.

In view of the prior art, it is now the object of the present invention to make available compositions for the production of anti-reflection coatings with which substrates can be provided with anti-reflection layers particularly simply and cost-effectively. In particular, the compositions should be capable of being applied to substrates by printing and roller coating methods, e.g. screen printing methods, and then being converted by simple means to anti-reflection layers. Another object consisted in providing compositions for the production of anti-reflection layers which can be converted to coatings with particularly good adhesion and mechanical stability.

These and other objects not explicitly mentioned, but which can readily be derived or deduced from the contexts discussed in the introductory part hereof, are achieved by a composition having all the features of claim 1. Useful modifications to the compositions according to the invention are protected in the subclaims. With regard to the production processes and use, the subject-matters of claims 18 and 23 provide ways of achieving the object on which the invention is based.

By means of the fact that a composition for the production of an anti-reflection coating comprises at least one polymeric flow control agent and at least one solvent having a boiling point of at least 150° C., it is surprisingly possible to provide a composition comprising a condensate obtainable by condensation of silicon compounds of the general formula $$R_nSiX_{4-n} \tag{I},$$

in which the residues X are the same or different and signify hydrolysable groups or hydroxyl groups, the residues R are the same or different and signify non-hydrolysable groups and n is 0, 1, 2 or 3, which can be applied to a substrate in a particularly simple and economic manner.

In particular, the composition can be applied to a substrate by roller application or by printing methods, for example screen printing methods. The coatings obtainable with the compositions according to the invention display high mechanical stability and good adhesion to many substrates. Moreover, the compositions according to the invention can be produced and processed cost-effectively and in an environmentally friendly manner. At the same time, the coated substrates exhibit surprisingly high transparency.

The composition according to the invention comprises at least one condensate, which is obtainable by condensation of silicon compounds of the general formula $$R_nSiX_{4-n} \tag{I},$$

in which the residues X are the same or different and signify hydrolysable groups or hydroxyl groups, the residues R are the same or different and signify non-hydrolysable groups and n is 0, 1, 2 or 3.

To produce the condensates, monomeric silicon compounds of formula I or pre-condensates derived therefrom may be used. The hydrolytic condensation takes place through the action of water or moisture and optionally in the presence of a catalyst and/or a solvent.

In the silicon compounds of formula I, the hydrolysable groups X are, for example, hydrogen or halogen, preferably F, Cl, Br or I; alkoxy, preferably $C_{1-6}$ alkoxy, such as e.g. methoxy, ethoxy, n-propoxy, i-propoxy and butoxy; aryloxy, preferably $C_{6-10}$ aryloxy, such as e.g. phenoxy; acyloxy; preferably $C_{1-6}$ acyloxy, such as e.g. acetoxy or propionyloxy; alkylcarbonyl, preferably $C_{2-7}$ alkylcarbonyl, such as e.g. acetyl; amino, monoalkylamino or dialkylamino with preferably 1 to 12, particularly 1 to 6 carbon atoms.

In formula I, R signifies a non-hydrolysable organic residue, which may optionally have a functional group. Examples of R are alkyl, preferably $C_{1-6}$ alkyl, such as methyl, ethyl, n-propyl, isopropyl, n-butyl, s-butyl and t-butyl, pentyl, hexyl or cyclohexyl; alkenyl, preferably $C_{2-6}$ alkenyl, such as e.g. vinyl, 1-propenyl, 2-propenyl and butenyl; alkynyl, preferably $C_{2-6}$ alkynyl, such as e.g. acetylenyl and propargyl; and aryl, preferably $C_{6-10}$ aryl, such as e.g. phenyl and naphthyl.

Special examples of functional groups of the residue R are the epoxy, hydroxy, ether, amino, monoalkylamino, dialkylamino, amide, carboxy, mercapto, thio ether, vinyl, acryloxy, methacryloxy, cyano, halogen, aldehyde, alkylcarbonyl, sulfonic acid and phosphoric acid groups. These functional groups are bound to the silicon atom by alkylene, alkenylene or arylene bridge groups, which can be interrupted by oxygen or sulfur atoms or NH groups. The said bridge groups are derived e.g. from the aforementioned alkyl, alkenyl or aryl residues. The residues R preferably contain 1 to 18, particularly 1 to 8 carbon atoms. The above-mentioned residues R and X may optionally contain one or more conventional substituents, such as e.g. halogen, alkyl, hydroxyalkyl, alkoxy, aryl, aryloxy, alkylcarbonyl, alkoxycarbonyl, furfuryl, tetrahydrofurfuryl, amino, monoalkylamino, dialkylamino, trialkylammonium, amido, hydroxy, formyl, carboxy, mercapto, cyano, isocyanato, nitro, epoxy, $SO_3H$ or $PO_4H_2$.

The silicon compounds of general formula I can be hydrolysed and condensed via the residues X. By means of these hydrolytically condensable groups, an inorganic network is constructed with Si—O—Si units. The residues R are hydrolytically stable under conventional condensation conditions, in contrast to the residues X.

In a preferred embodiment, silicon compounds of the general formula $SiX_4$, in which the residues X are the same or different and signify hydrolysable groups or hydroxyl groups, are used to produce the condensate. Without limiting the generality, specific examples of such silicon compounds are $SiCl_4$, $HSiCl_3$, $Si(OCH_3)_4$, $Si(OOCCH_3)_4$ and $Si(OC_2H_5)_4$, with tetraalkoxy silanes, for example $Si(OCH_3)_4$ (TMOS) or $Si(OCH_2CH_3)_4$ (TEOS) being particularly preferred. The above-mentioned compounds can be used individually or as a mixture. The proportion of silicon compounds of the general formula $SiX_4$ is preferably in the range of from 0 wt. % to 100 wt. % and particularly preferably in the range of from 20 wt. % to 80 wt. %, based on the total quantity of monomeric silicon compounds.

According to another aspect of the present invention, a mixture of silanes is preferably used for the production of the condensate, preferably comprising at least one silicon compound of the formula $RSiX_3$, in which the residues X are the same or different and signify hydrolysable groups or hydroxyl groups and the residue R signifies a non-hydrolysable groups. Without limiting the general teaching, specific examples of these silicon compounds are $Cl_3SiCH_3$, $Si(CH_3)(OC_2H_5)_3$, $Cl_3Si(C_2H_5)(C_2H_5)(OC_2H_5)_3$, $Si(OC_2H_5)_3(CH_2—CH=CH_2)$, $Si(OOCCH_3)_3(CH_2—CH=CH_2)$, $Cl_3Si(CH=CH_2)$, $Si(CH=CH_2)(OC_2H_5)_3$, $Si(CH=CH_2)(OC_2H_4OCH_3)_3$ and $Si(CH=CH_2)(OOCCH_3)_3$. The above-mentioned compounds may be used individually or as a mixture. The proportion of silicon compounds of the general formula $RSiX_3$ is preferably in the range of from 0 wt. % to 100 wt. % and particularly preferably in the range of from 20 to 80 based on the total quantity of monomeric silicon compounds.

The condensate can preferably be obtained by condensation of a mixture comprising at least one silicon compound of the formula $R_2SiX_2$, in which the residues X are the same or different and signify hydrolysable groups or hydroxyl groups and the residues R are the same or different and signify non-hydrolysable groups. Without limiting the general teaching, specific examples of such silicon compounds are $Cl_2Si(CH_3)_2$, $Si(CH_3)_2(OC_2H_5)_2$, $Si(C_2H_5)_2(OC_2H_5)_2$, $Cl_2Si(CH=CH_2)(CH_3)$, $Si(CH_3)_2(OCH_3)_2$, $Cl_2Si(C_6H_5)_2$ and $Si(C_6H_5)_2(OC_2H_5)_2$. The above-mentioned compounds may be used individually or as a mixture. The proportion of silicon compounds of the general formula $R_2SiX_2$ is preferably in the range of from 0 wt. % to 100 wt. % and particularly preferably in the range of from 20 wt. % to 80 wt. %, based on the total quantity of monomeric silicon compounds.

Moreover, the condensate can be obtained by condensation of a mixture comprising at least one silicon compound of the formula $R_3SiX$, in which the residue X signifies a hydrolysable group or a hydroxyl group and the residues R are the same or different and signify non-hydrolysable groups. Without limiting the general teaching, specific examples of these silicon compounds are $(C_6H_5)_3SiOH$, $Si(CH_3)_3(OC_2H_5)$ and $Si(CH_2CH_3)_3(OC_2H_5)$. The above-mentioned compounds may be used individually or as a mixture. The proportion of silicon compounds of the general formula $R_3SiX$ is preferably in the range of from 0 wt. % to 40 wt. % and particularly preferably in the range of from 10 wt. % to 20 wt. % based on the total quantity of monomeric silicon compounds.

According to another preferred embodiment, mixtures of silicon compounds of the formulae $SiX_4$, $RSiX_3$ and $R_3SiX$ set out above are used to produce the condensate.

According to a preferred aspect of the present invention, a mixture of silicon compounds of the formulae $SiX_4$ and $R_2SiX_2$ set out above may be used to produce the condensate.

The molar ratio of the silicon compounds of the general formulae $SiX_4$ to the silicon compounds of the general formulae $RSiX_3$ is preferably in the range of from 10:1 to 1:10 and particularly preferably in the range of from 3:1 to 1:3.

The molar ratio of the silicon compounds of the general formulae $SiX_4$ to the silicon compounds of the general formulae $R_3SiX$ is preferably in the range of from 10:1 to 1:10 and particularly preferably in the range of from 3:1 to 1:3.

The molar ratio of the silicon compounds of the general formulae $RSiX_3$ to the silicon compounds of the general formulae $R_3SiX$ is preferably in the range of from 10:1 to 1:10 and particularly preferably in the range of from 3:1 to 1:3.

The molar ratio of the silicon compounds of the general formulae $RSiX_4$ to the silicon compounds of the general formulae $R_2SiX_2$ is preferably in the range of from 10:1 to 1:10 and particularly preferably in the range of from 3:1 to 1:3.

Silanes of the general formula I can either be purchased or can be produced by methods as described in "Chemie and Technologie der Silicone" (W. Noll, Verlag Chemie, Weinheim/Bergstrasse, 1968). They can be used either as such or in pre-condensed form.

To construct the inorganic network, the silanes of the general formula I are hydrolysed and polycondensed. The polycondensation preferably takes place by the sol-gel process as described e.g. in DE 27 58 414, DE 27 58 415, DE 30 11 761, DE 38 26 715 and DE 38 35 968. The hydrolytic condensation can take place e.g. by adding the required water at room temperature or with slight cooling directly to the silicon compounds to be hydrolysed, which are present either as such or dissolved in a suitable solvent, and then stirring the resulting mixture for some time, for example one to several hours. The hydrolysis and polycondensation preferably take place with stirring and in the presence of an acidic or basic condensation catalyst such as HCl, $HNO_3$ or $NH_3$.

The hydrolysis generally takes place at temperatures of between −20 and 130° C., preferably between 60 and 110° C. or the boiling point of the optionally used solvent. The best way of adding water depends primarily on the reactivity of the starting compounds used. Thus, for example, the dissolved starting compounds can be dropped slowly into an excess of water or water is added in one portion or in portions to the optionally dissolved starting compounds. It may also be useful to add the water to the reaction system not as such but with the aid of aqueous organic or inorganic systems. However, the addition of water can also take place by means of a chemical reaction in which water is released in the course of the reaction. Examples of this are esterification reactions.

The proportion of $SiO_2$ condensate in the composition is preferably in the range of from 0.01 wt. % to 5 wt. % and particularly preferably in the range of from 0.1 wt. % to 3 wt. %. This proportion is based on the weight of the $SiO_2$ condensate after hydrolysis, without organic components. This content is obtained particularly readily from the weight of a layer obtained by a baking process, in relation to the weight before baking.

According to a particular aspect of the present invention, the condensate is present in the composition in a colloidally dispersed form.

Furthermore, the composition according to the invention comprises at least one polymeric flow control agent. Flow control agents within the meaning of the present invention are compounds that lead to pseudoplasticity or thixotropic behaviour in a composition. These compounds are common additives in screen-printing pastes. These polymers preferably have a dispersion- and colloid-stabilising effect. Preferred flow control agents can be completely incinerated from a temperature of approx. 500° C. Preferred flow control agents comprise hydroxy groups.

The molecular weight of the flow control agent is preferably in the range of from 500 g/mol to 500000 g/mol and particularly preferably in the range of from 2000 g/mol to 400000 g/mol. The molecular weight here refers to the weight average and can be determined e.g. by gel permeation chromatography (GPC).

According to a particular aspect, in particular cellulose, cellulose derivatives and particularly preferably cellulose ether and/or cellulose ester, can be used as the flow control agent. These include in particular hydroxypropyl methylcellulose.

The quantity of flow control agent is preferably in the range of from 0.1 wt. % to 40 wt. % and particularly preferably in the range of from 5 wt. % to 15 wt. %.

In addition, the composition according to the invention preferably comprises at least 60 wt. % and particularly preferably at least 70 wt. % solvent having a boiling point of at least 150° C. and particularly preferably at least 200° C. According to a preferred aspect of the present invention, the quantity of solvent can be in the range of from 60 to 99.5 wt. % and particularly preferably in the range of from 80 to 95 wt. %. Preferred examples of suitable high-boiling organic solvents are di-, tri-, tetra-, penta- or hexamers of monoglycols, such as e.g. the di-, tri-, tetra-, penta- or hexamers of ethylene, propylene or butylene glycol, and the mono- or diethers thereof, wherein one or both hydroxyl groups can be replaced e.g. by a methoxy, ethoxy, propoxy or butoxy group; terpenes, e.g. terpineol; and polyols, e.g. 2-methyl-2,4-pentanediol. Special high-boiling solvents are polyethylene glycols and ethers thereof, such as diethylene glycol, triethylene glycol and tetraethylene glycol, diethylene glycol diethyl ether, tetraethylene glycol dimethyl ether or diethylene glycol monobutyl ether. Among these, diethylene glycol, tetraethylene glycol and diethylene glycol monobutyl ether are particularly preferred. Mixtures of two or more of these solvents may, of course, also be used.

The quantity of the solvent used depends on the quantity and solubility of the (partially) condensed silicon compounds and the polymers used. Moreover, an alcohol can act as moderator for the hydrolysis and the condensation and as a result, the reactivity of the system can be controlled and adapted to the requirements of the particular application.

The composition of the present invention can advantageously be applied to a substrate by printing methods, e.g. screen printing methods, and by roller application. Accordingly, the composition according to the invention displays pseudoplasticity or thixotropic behaviour. At a shear of 0.5 $s^{-1}$ and a temperature of 25° C., preferred compositions have a viscosity in the range of from 0.5 Pa*s to 8 Pa*s and particularly preferably 1.0 to 6 Pa*s. The viscosity of preferred compositions at a shear of 30 $s^{-1}$ and a temperature of 25° C. is preferably in the range of from 0.6 Pa*s to 4 Pa*s and particularly preferably in the range of from 0.8 Pa*s to 2.5 Pa*s. At a shear of 0.5 $s^{-1}$, the viscosity of the composition is preferably at least twice as high as the viscosity at a shear of 30 $s^{-1}$.

The composition can preferably be present as a colloidally dispersed solution, in which the condensate is present in the composition in particle form. The composition according to the invention can advantageously be obtained by mixing the individual components of the composition, with the previously described condensation of the silicon compounds of formula I preferably taking place in the presence of the flow control agent. The monomeric silicon compounds or pre-condensates can be used here.

Surprisingly, the production can take place in one step here, the amount of water being selected such that the smallest possible amount of excess water has to be separated off. Preferably no more than 20 wt. % and particularly preferably no more than 5 wt. % water has to be separated out of the composition after the hydrolysis. According to a particularly preferred embodiment, no water is separated off after the hydrolysis. Surprisingly, this makes it possible to produce the composition in one step.

After the hydrolysis of the silicon compounds for the production of the condensate, solvents and/or flow control agent can be added to the compositions obtained. This enables the composition to be adapted to the requirements of the coating machine. As a result of this measure, it is possible for example to adjust the film thickness of the anti-reflection coating. Surprisingly, therefore, the present invention provides a paste which can be adapted by simple means to the particular requirements of the specific devices for applying the paste. As a result, advantages relating in particular to production technology can be achieved.

After the composition has been applied, the organic components, i.e. the flow control agent, the solvents and the residues R that may optionally be present in the polycondensate, can be removed by heating. The temperatures used here naturally depend on the heat stability of the coated substrates and of the organic components to be removed. The result is a purely inorganic anti-reflection coating, which can withstand high thermal loads. The heating preferably takes place at temperatures in the range of from 500° C. to 1000° C. and particularly preferably in the range of from 550 to 700° C. The baking can take place in conventional sheet glass furnaces or hardening furnaces.

The composition according to the invention can be applied on to mineral glasses in order to reduce reflection. The anti-reflection coating according to the invention can be used e.g. to eliminate reflections and to increase the transmission of cathode ray tubes, instrument displays, spectacle lenses, screens, solar collectors, windows etc.

Preferred substrates provided with an anti-reflection coating can, for example, exhibit a transmission of at least 95% and preferably at least 96%. It is possible here for the coating to be applied on either one side or both sides, with application on both sides often leading to particularly high transmission or low reflection. The present invention is explained in more detail below with the aid of examples, without a limitation of the invention being intended as a result.

EXAMPLE 1

Preparation of a Paste from Triphenylsilanol, MTES and TEOS in One Step 2.3 g triphenylsilanol, 1.734 g tetraethoxysilane and 0.742 g methyltriethoxysilane are dissolved in 42.37 g of a solution of 7.5% hydroxypropyl methylcellulose (Klucel L) in glycol ether (Dowanol TPM). Next, 0.25 g 65% $HNO_3$ and 2.43 g water are mixed in. Following this, 0.18 g 25% ammonia are stirred in and the mixture is stirred for 2 hours at 70° C. under reflux. A clear, transparent paste is formed. The paste is mixed with a solution of 7.5% Klucel L in Dowanol TPM 1:1, printed on to sheet glass using a 100T screen, dried at 120° C. for 10 minutes and baked for 5 minutes at 600° C. An anti-reflection layer giving a colourless reflection is formed. When coated on both sides, a glass is obtained which displays particularly low reflection, the transmission being increased by about 6% compared with the original glass.

EXAMPLE 2

Preparation of a Paste from Diphenyldiethoxysilane and TEOS in One Step 4.534 g diphenyldiethoxysilane and 1.734 g tetraethoxysilane are dissolved in 40.88 g of a solution of 7.5% Klucel L in Dowanol TPM. Next, 0.25 g 65% $HNO_3$ and 2.43 g water are mixed in. Following this, 0.18 g 25% ammonia are stirred in and the mixture is stirred for 2 hours at 70° C. under reflux. A clear, transparent paste is formed. The paste is mixed with a solution of 7.5% Klucel L in Dowanol TPM 1:1, printed on to sheet glass using a 100T screen, dried at 120° C. for 10 minutes and baked for 5 minutes at 600° C. An anti-reflection layer giving a colourless reflection is formed. When coated on both sides, a glass is obtained which displays particularly low reflection, the transmission being increased by about 5% compared with the original glass.

The invention claimed is:

1. A colloidal solution composition for the production of an anti-reflection coating, comprising
   (a) colloidal particles of an $SiO_2$ condensate obtained by condensation, in the presence of at least one hydroxyl-containing polymeric flow control agent, of silicon compounds of the general formula $$R_n SiX_{4-n} \qquad (I),$$

in which the residues X are the same or different and signify hydrolysable groups or hydroxyl groups, the residues R are the same or different and signify non-hydrolysable groups and n is 0, 1, 2 or 3,
   (b) 5 to 15 wt % of at least one polymeric flow control agent and
   (c) at least one solvent having a boiling point of at least 150° C.

2. The composition according to claim 1, characterised in that the composition has a viscosity in the range of from 1.0 to 6 Pa*s at a shear of 0.5 $s^{-1}$ and a temperature of 25° C.

3. The composition of claim 1, wherein the composition has a viscosity in the range of from 0.8 Pa*s to 2.5 Pa*s at a shear of 30 $s^{-1}$ and a temperature of 25° C.

4. The composition of claim 1, characterised in that the flow control agent is at least one of cellulose ether and cellulose ester.

5. The composition of claim 1, wherein the flow control agent has a molecular weight $M_w$ in the range of from 500 to 500000 g/mol.

6. The composition of claim 1, wherein the condensate is obtained by condensation of a mixture comprising at least one silicon compound of the formula $SiX_4$, in which the residues X are the same or different and signify hydrolysable groups or hydroxyl groups.

7. The composition according to claim 6, characterised in that the proportion of the silicon compound according to the formula $SiX_4$ is in the range of from 20 wt. % to 80 wt. %, based on the total quantity of monomeric silicon compounds.

8. The composition of claim 6, wherein the composition contains at least 60 wt. % solvent having a boiling point of at least 150° C.

9. The composition of claim 1, wherein the condensate is obtained by condensation of a mixture comprising at least one silicon compound of the formula $RSiX_3$, in which the residues X are the same or different and signify hydrolysable groups or hydroxyl groups and the residue R signifies a non-hydrolysable groups.

10. The composition of claim 1, wherein the condensate is obtained by condensation of a mixture comprising at least one silicon compound of the formula $R_2SiX_2$, in which the residues X are the same or different and signify hydrolysable groups or hydroxyl groups and the residues R are the same or different and signify non-hydrolysable groups.

11. The composition of claim 1, wherein the condensate is obtained by condensation of a mixture comprising at least one silicon compound of the formula $R_3SiX$, in which the residue X signifies a hydrolysable group or a hydroxyl group and the residues R are the same or different and signify non-hydrolysable groups.

12. The composition according to claim 1, wherein the composition has at least 70 wt. % solvent.

13. The composition of claim 1, wherein the solvent has a boiling point of at least 200° C.

14. The composition of claim 1, wherein the condensate was produced in the presence of at least one polymeric flow control agent and at least one solvent having a boiling point of at least 150° C.

15. The composition of claim 1, wherein the proportion of $SiO_2$ condensate in the composition is in the range of from 0.01 wt. % to 5 wt. %.

16. A process for the production of an anti-reflection coating, wherein the composition of claim 1 is applied to a substrate and baked to obtain a nanoporous layer.

17. The process according to claim 16, characterised in that the composition is applied by screen-printing methods or roller-coating methods.

18. The process of claim 16, wherein the composition is baked at a temperature in the range of from 550° C. to 750° C.

19. The process of claim 16, wherein the film thickness of the anti-reflection coating is adjusted by mixing the composition with a mixture containing solvents and flow control agents.

20. The process of claim 16, wherein the baking takes place in a sheet glass furnace or hardening furnace.

21. A process for producing the colloidal solution composition of claim 1, comprising (1) mixing (a) at least one solvent having a boiling point of at least 150° C., (b) 5 wt % to 15 wt % of at least one flow control agent, (c) water and (d) at least one compound of the general formula $$R_n SiX_{4-n} \qquad (I),$$

in which the residues are the same or different and R signifies an organic residue with 1 to 10 carbon atoms, which are optionally interrupted by at least one of oxygen atoms, sulfur atoms and amino groups, X denotes hydrogen, halogen, hydroxy, alkoxy, acyloxy, alkylcarbonyl, alkoxycarbonyl or NR'$_2$, with R' equal to hydrogen, alkyl or aryl and n equal to 0, 1, 2 or 3, and (2) condensing the compounds of formula (I).

22. The process according to claim 21, characterised in that the condensation is catalysed with an acidic or a basic compound.

23. The process according to claim 21, characterised in that the condensation is catalysed with at least one of ammonia and an ammonium salt.

24. The process of claim 21, wherein the quantity of water added is selected such that no more than 20 wt. % of the water is separated off by distillation during or after the condensation.

25. The process of claim 21, wherein the composition is produced in a single process step, wherein the individual components are mixed and condensed.

* * * * *